(12) United States Patent
Bailey et al.

(10) Patent No.: US 8,152,949 B2
(45) Date of Patent: Apr. 10, 2012

(54) PULTRUDED ARC-SEGMENTED PIPE

(75) Inventors: Stephen L. Bailey, Los Gatos, CA (US); Alan K. Miller, Santa Cruz, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 329 days.

(21) Appl. No.: 12/622,830

(22) Filed: Nov. 20, 2009

(65) Prior Publication Data

US 2011/0120636 A1   May 26, 2011

(51) Int. Cl.
*B29C 70/52* (2006.01)

(52) U.S. Cl. .................. 156/244.11; 156/166; 156/176; 156/178; 156/180; 156/182; 156/242; 156/244.13; 156/244.18; 156/244.22; 156/244.24; 138/128

(58) Field of Classification Search .................. 138/128; 156/166, 176, 178, 180, 182, 242, 244.11, 156/244.13, 244.18, 244.22, 244.24, 296
See application file for complete search history.

(56) References Cited

U.S. PATENT DOCUMENTS

| | | | |
|---|---|---|---|
| 2,122,380 A | 6/1938 | Ragsdale et al. | |
| 3,908,703 A | 9/1975 | Bournazel et al. | |
| 4,102,142 A | 7/1978 | Lee | |
| 4,191,518 A | 3/1980 | Kojimoto et al. | |
| 4,212,329 A | 7/1980 | Horton | |
| 4,383,554 A | 5/1983 | Merriman | |
| 6,155,748 A | 12/2000 | Allen et al. | |
| 6,189,575 B1 | 2/2001 | Ions et al. | |
| 7,017,613 B2 | 3/2006 | Miura et al. | |
| 7,328,747 B2 | 2/2008 | Jones et al. | |
| 2004/0025955 A1 | 2/2004 | Skinner et al. | |
| 2007/0193676 A1* | 8/2007 | Portoles | 156/169 |

* cited by examiner

*Primary Examiner* — Khanh P Nguyen
*Assistant Examiner* — Carson Gross
(74) *Attorney, Agent, or Firm* — DeMont & Breyer, LLC

(57) ABSTRACT

A method for forming a large diameter and very long pipe comprises forming a plurality of pultruded segments via pultrusion and joining the segments along the lengthwise edges thereof.

16 Claims, 5 Drawing Sheets

PULTRUDED ARC-SEGMENTED PIPE

FIELD OF THE INVENTION

The present invention relates to the manufacture of very long, large diameter pipes.

BACKGROUND OF THE INVENTION

There are some applications in which large diameter underwater pipes are required to transport large volumes of fluid under low pressures. One such application is in ocean thermal energy conversion (OTEC) plants.

An OTEC system uses the naturally occurring temperature difference between water at the surface of an ocean and water from the depths of the ocean to drive a power-producing cycle. As long as the temperature between the warm surface water and the cold deep water differs by about 20° C., an OTEC system can produce a significant amount of power.

A conventional OTEC system incorporates an electrical generation system, which is located at the surface of the water and produces electrical energy using the temperature differential between fluids in two heat exchangers. A first heat exchanger uses the heat from warm surface water to vaporize a fluid contained in a closed-loop conduit. The energy of the vaporized fluid is used to spin a turbine, which turns an electrical generator that generates electrical energy. After the vaporized fluid passes through the turbine, it is channeled by the conduit to the second heat exchanger. The second heat exchanger uses cold water piped up from the depths of the ocean to condense the vapor back to the liquid state.

The cold water received by the second heat exchanger is typically pumped up to it from a depth of a thousand meters or more through a "cold-water pipe" that extends those many meters from the surface of the ocean to its depths.

Although OTEC is a promising technology, its commercialization has been limited by a number of technical challenges. Among other challenges are the fabrication, transportation, and installation of the cold-water pipe, which can exceed 10 meters in diameter and 1000 meters in length.

Conventional large-diameter pipes of great length are usually fabricated by forming short cylindrical sections and then joining them end to end. Typically, the pipes are made from metal, concrete, or composite materials. Pipes that are made of metal are constructed of rolled sheets that are welded and internally stiffened via rings. This requires extensive skilled welding labor and results in a very heavy pipe. Concrete pipes are slip formed and pre-tensioned. Joining the circular segments is very difficult and the resulting pipe is, of course, exceedingly heavy.

Composite pipes constructed to date comprise a filament-wound inner laminate, a core sprayed over the inner laminate, and an outer laminate that is filament wound over the core. The length of the mandrel (and the ability to remove the composite from the mandrel) limits the length of a unitary section of composite pipe to only a few meters. Many sections must be joined, end-to-end, to create an cold-water pipe suitable for the OTEC application. The sections are butt joined with an overwrap. Each of the many required butt joints is a weak spot in the pipe. Furthermore, the joining process is very labor intensive.

Once a long-length, large-diameter pipe is manufactured, it must be transported to the OTEC plant. Whether transported in assembled form or in segments, transportation is expensive and raises safety concerns. Once on site, the pipe must be up-ended (or assembled and then up-ended) for submersion into the ocean. This is also a difficult and potentially quite risky procedure.

SUMMARY OF THE INVENTION

The present invention provides a large-diameter, long-length pipe that avoids some of the costs and disadvantages of the prior art.

In accordance with the illustrative embodiment of the invention, large-diameter, long-length pipe is formed by joining together a plurality of segments. The segments are formed via a pultrusion process, and are henceforth referred to as "pultruded segments." Rather than joining the pultruded segments end-to-end, the segments are joined side-by-side (i.e., along their length).

Each pultruded segment has a length that is equal to the desired length of the finished pipe, which is typically at least about 300 meters and more often in excess of 1000 meters (especially for OTEC applications). The arc-length and curvature of each pultruded segment is such that when a specific number of such segments are joined together, a pipe having a desired or near-desired diameter results.

In some embodiments, a large-diameter, long-length pipe is manufactured by forming, in parallel, the number of pultruded segments that are required to create the pipe. This is accomplished, in some embodiments, by locating the requisite number of pultrusion lines (i.e., the equipment required for the pultrusion process) at the site where the pipe is ultimately to be installed. For an application such as OTEC, the pultrusion lines are advantageously vertically oriented and situated on a platform such that the "growing" pultrusions extend downward into the ocean. The pultrusion lines are situated in a circle such that the pultruded segments grow side-by-side into the ocean and are appropriately positioned to form the "wall" of the finished pipe.

In some embodiments, the pultruded segments are bonded to one another along their length, such as by a rapidly curing adhesive (e.g., UV-curing underwater adhesive, etc.). Adhesive is applied before the pultruded segments enter the water.

In some other embodiments, a large-diameter, long-length pipe is manufactured by individually (i.e., via a single pultrusion line) forming the requisite number of pultruded segments, wherein the segments incorporate "snap together" technology. This technology is currently being used for a variety of technological applications (e.g., aerospace, conveyors, vehicle bridge decks, etc.).

In the present context, snap-together technology enables the pultruded segments to be joined to one another without bonding via adhesive or other methods. Rather, the pultruded segments themselves are formed with cooperating features. For example, adjacent pultruded segments incorporate members that overlap and form an interference fit, male snaps that engage female receptacles, and the like. Thus, one formed, each pultruded segment is held in position under water. A temporary tool is then used to "snap" or "zip" the pultruded segments along their length. These features, in conjunction with the natural flexibility and resilience in the composite material used to form the segments, provide an ability to securely join the segments without the use of adhesives. Although snap-together technology dispenses with the need for adhesives, adhesives can be used to supplement the joining process. In such embodiments, the tool that is used to snap the segments together applies underwater curing epoxy to interfacing surfaces to enhance the joinder.

DETAILED DESCRIPTION

Definitions. The term "substantially," when used to modify a value of an angle (e.g., substantially 45 degrees, etc.), means that the angle is within about ±10 degrees of the stated angle. When referring to a dimension (e.g., substantially 10 meters), the term substantially means within about ±10% of the stated dimension.

The methods described herein are suitable for the manufacture of pipe. The methods described herein are particularly advantageous for the manufacture of pipes having a large diameter and a long length. In particular, the methods are well suited to the manufacture of pipes having diameters in excess of 4 meters and lengths in excess of 300 meters. Although there is no technologically-imposed lower limit as to the diameter or length of pipes that can be manufactured via the inventive methods described herein, economics will dictate the applicability of such methods, which is typically for the manufacture of relatively large-diameter, long-length pipes.

Figure 1:
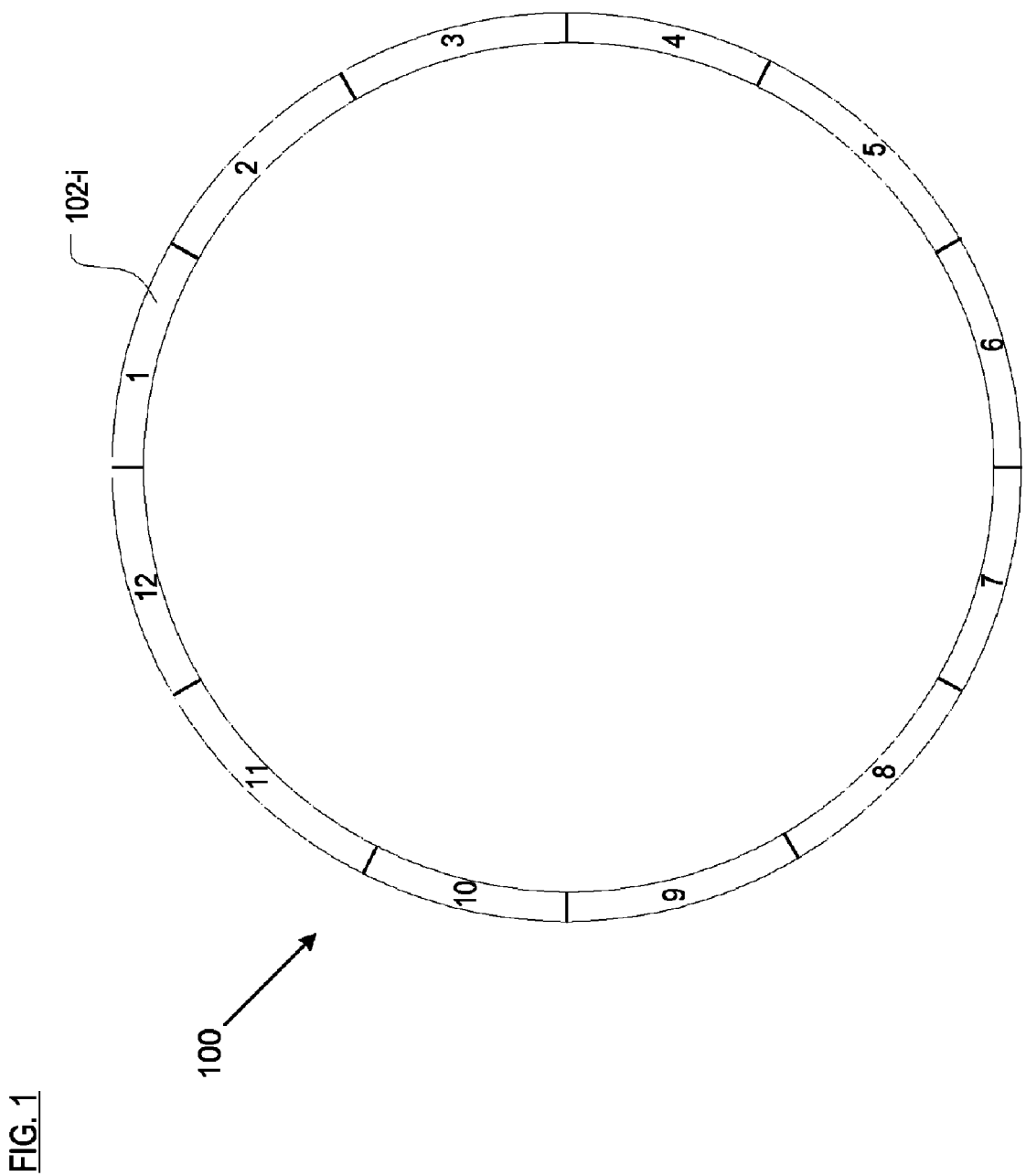
FIG. 1 depicts a sectional view of a pipe that is manufactured by a process in accordance with the present invention.

FIG. 1 depicts pipe 100 in accordance with the illustrative embodiment of the present invention. Pipe 100 comprises a plurality of pultruded segments 102-$i$ that are joined together. Each pultruded segment 102-$i$ is formed to be appropriately curved, in the manner of an arc of a circle, to facilitate the formation of pipe having a circular cross section when all the pultruded segments are joined together.

In the embodiment that is depicted in FIG. 1, pipe 100 comprises twelve pultruded segments, 102-1 through 102-12. In other embodiments, pipes formed in accordance with the illustrative embodiment will include fewer or more segments, as is dictated by the desired diameter of the finished pipe and the width and curvature that can be formed in each pultruded segment 102-$i$.

Figure 2:
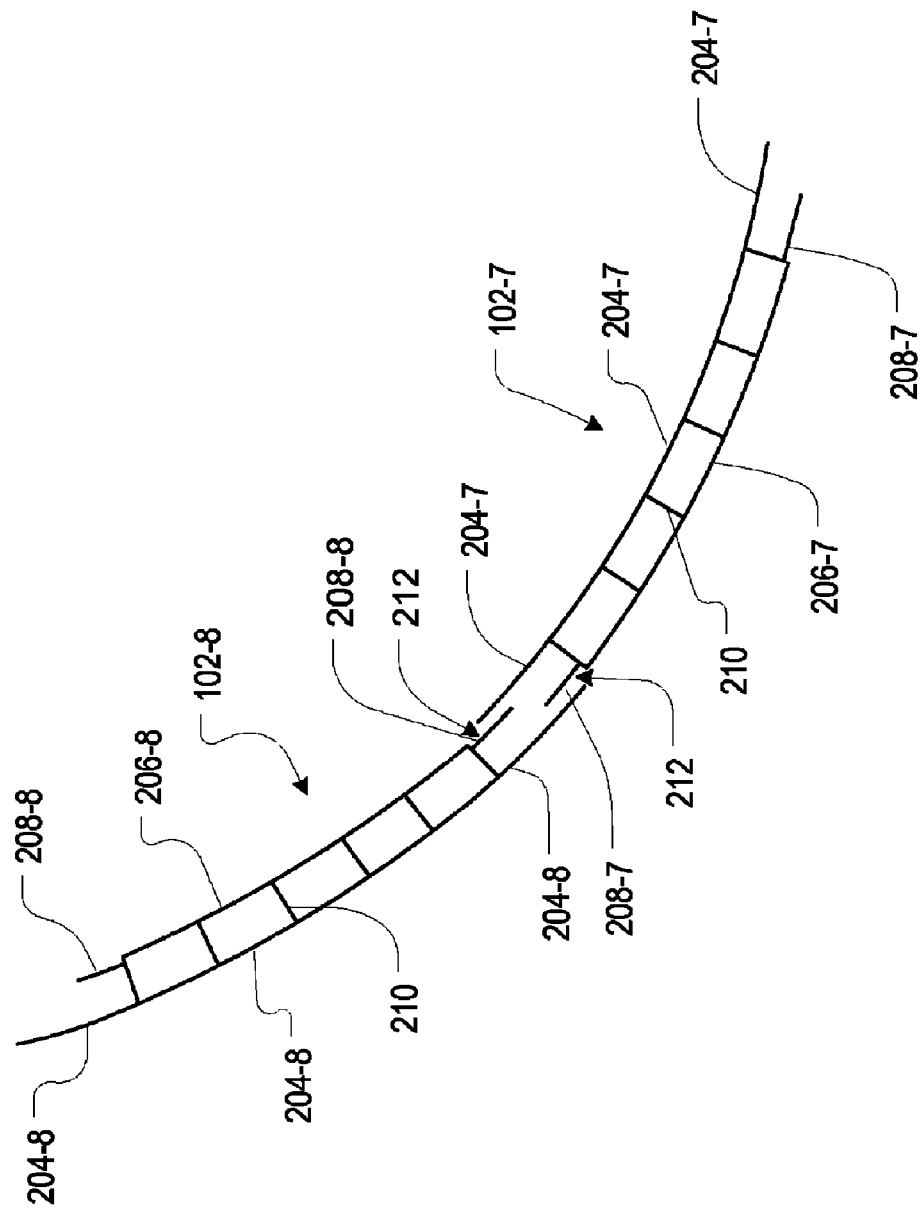
FIG. 2 depicts two adjacent segments of the pipe that is shown in FIG. 1.

In some applications, such as those in which there will be a pressure differential between the inside and the outside of pipe 100, it will be desirable to reinforce the pipe wall so that it is resistant to buckling. FIG. 2 depicts two such reinforced pultruded segments 102-7 and 102-8 of pipe 100. It is notable that in embodiments in which pipe 100 possesses a reinforced wall, all pultruded segments 102-$i$ are reinforced.

As depicted in FIG. 2, segment 102-7 comprises a first wall 204-7 and a second wall 206-7. The two walls are spaced apart via internal support walls 210. In the illustrative embodiment, support walls 210 are substantially orthogonal to the first and second wall. Second wall 206-7 is shorter in length than first wall 204-7. Flanges 208-7 depend from both ends of second wall 206-7, although slightly radially inward thereof.

Also depicted in FIG. 2 is pultruded segment 102-8. This segment is adjacent to and joined to segment 102-7 in finished pipe 100, as depicted in FIG. 1. In FIG. 2, these two segments are depicted, for clarity, adjacent to one another but prior to being joined.

Like pultruded segment 102-7, segment 102-8 comprises two walls 204-8 and 206-8 that are spaced apart by support walls 210. Also, flanges 208-8 depend from both ends of shorter wall 206-8, although slightly radially outward thereof.

Although pultruded segments 102-7 and 102-8 have the same sandwich-type construction, they do differ. In particular, in segment 102-7, the outer wall (of what will be finished pipe 100) is the relatively shorter wall 206-7 having flanged ends 208-7. But in pultruded segment 102-8, the relatively shorter wall 206-8 having flanged ends 208-8 is the inner wall (of finished pipe 100). Thus, adjacent pultruded segments exhibit an inverse relationship in this regard.

As previously noted, flanged ends 208-7 of pultruded segment 102-7 are disposed radially-inward of outer wall 206-7. This creates region 212 for receiving the extended portion of wall 204-8 of segment 102-8. And due to the inverse relationship of adjacent segments, region 212 created by the radially-outward disposition of flange 208-8 (relative to wall 206-8) receives the extended portion of wall 204-7.

Regions 212 providing bonding sites for joining adjacent pultruded segments. For example, in some embodiments, an adhesive is applied to one or both of facing sides of flange 208-7 and the extended portion of wall 204-8 and to one or both of facing sides of flange 208-8 and the extended portion of wall 204-7. In some embodiments, the adhesive is an epoxy, such as a UV-curing epoxy.

Pultruded segments 102-$i$ that are used to form pipe 100 are manufactured via a pultrusion process. The pultrusion process, which is well known to those skilled in the art, is a continuous process for manufacturing composite articles. It is particularly effective for producing long, relatively narrow parts. It can be used to form parts that include hollows or chambers, such as are present in segments 102-$i$. A typical pultrusion process is depicted via a block diagram in FIG. 3.

Figure 3:
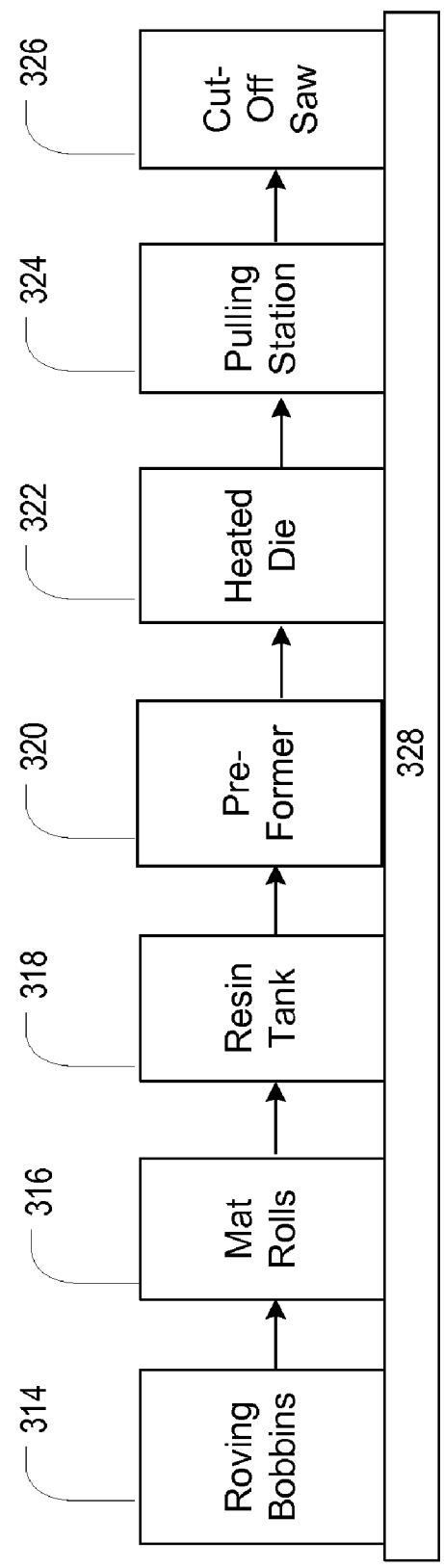
FIG. 3 depicts a conventional pultrusion line, such as can be used to make the segments depicted in FIG. 2.

As depicted in FIG. 3, pultrusion line 313, which is situated on a platform 328, includes roving bobbins 314, mat rolls 316, resin tank 318, pre-former 320, heated die 322, pulling station 324, and cut-off saw 326.

Roving bobbins 314 are mounted on a frame and hold multiple strands of glass or other types (e.g., carbon, Aramid, etc.) of roving. The roving forms the core of the subsequent pultrusion.

Mat rolls 316 comprise two or more frame-mounted reels or bobbins of a random (typically glass) mat that encases the roving. Other reinforcements include woven and stitched fabrics.

The roving and mat then pass through resin tank 318 for wetting the individual rovings. The pultrusion resin will advantageously have a fairly low viscosity (for good, rapid impregnation of the rovings), a long pot life (for continuous processing), and a short cure time for a full cure. Typical pultrusion resins include standard thermosetting resins such as polyesters, vinyl esters, epoxies, phenolics, and urethanes. Thermoplastics resins can also be used.

From resin tank 318, the roving and mat enters pre-former 320 in which the roving and mat are consolidated and compacted into their final position.

The consolidated roving and mat enters heated die 322. The die controls the precise form of the part (i.e., pultruded segment) being manufactured. The die must maintain fiber alignment, compress the fibers to the desired volume fraction, and cure the composite in a relatively short period of time. This must occur without damage to the fibers. A cured and rigid form exits.

Pulling station 324 generates the pulling force that drives the pultrusion line. A set of clamps grip the cured form and pulls it. In order for the line to be continuous, two sets of clamps are used, with one pulling while the other travels back to its initial position. Finally, cut-off saw 326 is used to size the pultruded form. The saw is typically automatically activated by a measuring device.

In this fashion, pultrusion line 313 creates pultrusion segments 102-$i$. Using currently available technology, the width of the pultruded segment is limited to a maximum of about 2.5 meters. Of course, the length of the pultrusion segment is essentially unlimited.

The method described herein can therefore be used to form a pipe having an actual length L and a desired diameter D. In particular, each pultruded segment 102-$i$ is formed to have length L. That is, processing continues until the length of the segment being formed is equal to L.

Each pultruded segment 102-$i$ is formed to have an arc length A, wherein, for a large pipe, the arc length A is assumed to be the maximum (currently) attainable from a pultrusion process, which is about 2.5 meters. Given pultruded segments 102-$i$ having identical arc length A, the number N of pultruded segments required to form a pipe having a desired diameter D is given by: N≈($\pi \times$D)/A. The value of ($\pi \times$D)/A will almost certainly not be an integer. Assuming equal arc length for each pultruded segment, the result of ($\pi \times$D)/A will be rounded to the nearest integer value. As a consequence, N will not be equal to ($\pi \times$D)/A; rather, it will be equal to ($\pi \times$D*)/A, wherein D* is the actual diameter D* of the finished pipe. In other words, actual diameter D* will be slightly different than the desired or target diameter D. Arc length A can be adjusted, within the constraints of pultrusion capacities, along with the number of segments to form the correct pipe diameter.

For example, assume a pipe having a length of 1000 meters and a diameter of 10 meters is to be manufactured. Assuming that the arc length of each pultruded segment 102-$i$ is to be equal and is 2.5 meters, then the required number of segments is:

$$\pi \times 10/2.5 = 12.56 \text{ which is rounded either up (13) or down (12)}.$$

The actual diameter of a pipe having 12 segments, each having an arc length of 2.5 meters is:

$$12 \times 2.5/\pi = 9.55 \text{ meters}.$$

Each segment is pultruded to have a length of 1000 meters.

Of course, if the manufacturing process allows for the arc length of the pultruded segments 102-$i$ to differ from one another, and if doing so is advantageous to the assembly, then a finished pipe having a diameter that is very close to the desired diameter D can be formed. For example, returning to the scenario of a pipe having a desired diameter of 10 meters, it was determined that 12.56 segments having an arc length of 2.5 meters is required. In other words, given twelve segments having an arc length of 2.5 meters and one segment having an arc length of:

$$0.56 \times 2.5 = 1.4 \text{ meters},$$

a 10 meter-diameter pipe results:

$$[(12 \times 2.5) + (1 \times 1.4)]/\pi = 10.0 \text{ meters}.$$

Figures 4A, 4B:
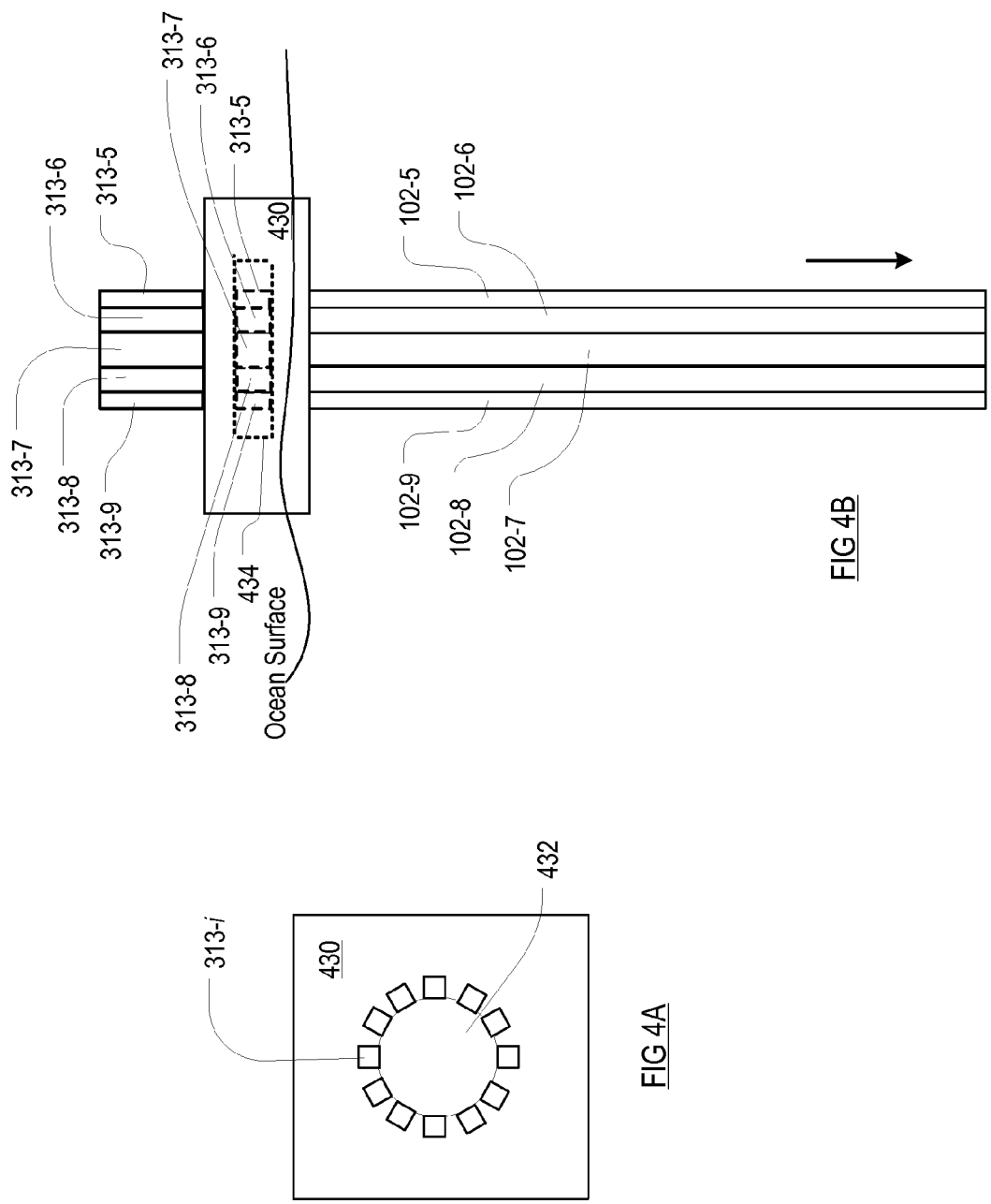
FIG. 4A depicts a top view of a facility for manufacturing pipe in accordance with the illustrative embodiment of the present invention.
FIG. 4B depicts, via a side view, the facility of FIG. 4A in the process of manufacturing large-diameter, long-length pipe on a floating platform in accordance with the illustrative embodiment of the present invention.

FIGS. 4A (plan view) and 4B (side view) depict platform 430 with circular opening 432. Twelve pultrusion lines 313-$i$ are longitudinally disposed and arranged about circular opening 432. In FIG. 4B, the platform is depicted as floating in the ocean. Five of the pultrusion lines (i.e., lines 313-5 through 313-9) are visible in FIG. 4B. Also depicted in FIG. 4B are five pultruded segments 102-5 through 102-9 that a "growing" into the ocean as they are being formed via the pultrusion lines.

In some embodiments, segments 102-5 through 102-9 are joined to one another at a bonding station 434, wherein a rapidly curable epoxy is applied, such as at regions 212 (see FIG. 2).

In some alternative embodiments (not depicted), segments 102-$i$ are formed one at time, arranged vertically, side-by-side, and then joined via "snap-together" technology. In such embodiments, a fixture moves along the length of adjacent segments 102-$i$ and "snaps" them together. In conjunction with the present disclosure, those skilled in the art will know how to apply snap-together technology to the pultruded segments 102-$i$.

Figure 5:
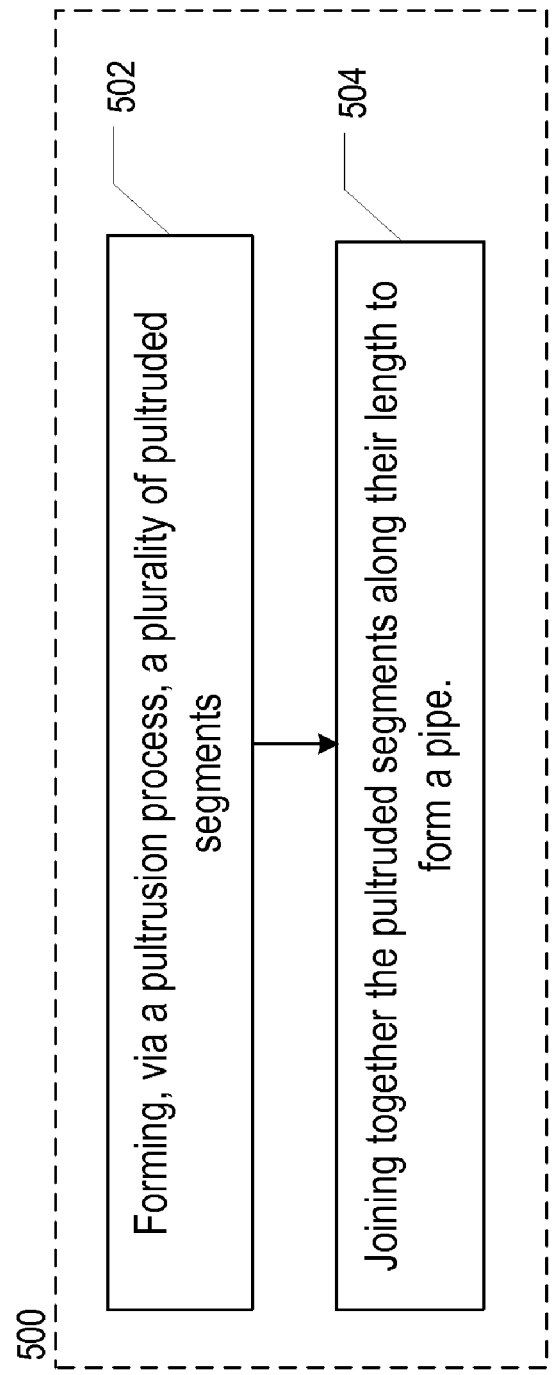
FIG. 5 depicts a flow diagram of a method in accordance with the illustrative embodiment of the present invention.

FIG. 5 depicts a flow diagram of process 500 for forming pipe in accordance with the present method. As depicted in operation 502, a plurality of pultruded segments are formed. In accordance with operation 504, those segments are joined along their length to form a pipe.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for forming a pipe, wherein the method comprises:
    forming, via a pultrusion process, a number N of pultruded segments from a composite material, wherein each pultruded segment is a multi-cell panel comprising a first wall and a second wall that are spaced apart from one another with a plurality of support walls disposed therebetween, and wherein one of the first wall or the second wall of each pultruded segment defines an exterior surface of the pipe; and
    joining the number N of pultruded segments along the length thereof, thereby forming the pipe.

2. The method of claim 1 wherein N is 12.

3. The method of claim 1 wherein an arc length A of each pultruded segment is 2.5 meters.

4. The method of claim 1 wherein the plurality of support walls within each pultruded segment are substantially orthogonal to the first wall and the second wall of each such pultruded segment.

5. The method of claim 1 wherein in the operation of forming, the pultrusion process is performed via a pultrusion line, and further wherein N pultrusion lines are used to produce the N pultruded segments.

6. The method of claim 5 wherein the pultrusion lines are disposed on a platform that is located in an ocean, and wherein the pultrusion lines are configured vertically so that as the pultruded segments are formed, they extend downward into the ocean.

7. The method of claim 1 wherein the operation of joining further comprises joining the pultruded segments via an adhesive.

8. The method of claim 1 wherein the operation of joining further comprises joining the pultruded segments underwater.

9. The method of claim 1 wherein the operation of forming further comprises configuring lengthwise edges of each of the pultruded segments for snap-together assembly.

10. The method of claim 9 wherein the operation of joining further comprises using a fixture to snap together adjacent pultruded segments.

11. The method of claim 9 wherein the operation of forming further comprises using a single pultrusion line to form N pultruded segments.

12. A method comprising:
   providing a number N of pultrusion lines, wherein each pultrusion line is operable to form a pultruded segment from a composite material;
   providing a platform for receiving the pultrusion lines; and
   disposing the pultrusion lines on a platform, wherein the operation of disposing further comprises:
   (a) vertically orienting the pultrusion lines with respect to the platform such that the pultruded segment being produced from each pultrusion line extends downwardly with respect to the platform;
   (b) spacing the pultrusion lines so that the pultruded segments produced by adjacent pultrusion lines are adjacent to each other; and
   (c) arranging the pultrusion lines in a circle such that the pultruded segments formed from the pultrusion lines collectively define a cylindrical shape having a diameter substantially equal to a desired diameter of pipe that is to be formed using the pultrusion lines.

13. The method of claim 12 wherein the operation of providing a platform further comprising floating the platform in a body of water.

14. The method of claim 12 wherein the operation of providing a platform further comprises forming a hole in the platform.

15. The method of claim 14 wherein the operation of disposing further comprises positioning the pultrusion lines so that the pultruded segments formed therefrom extend through the hole in the platform.

16. The method of claim 12 further comprising providing a bonding station for permanently attaching adjacent pultruded segments to one another, wherein the bonding station is disposed on the platform.

* * * * *